(12) United States Patent  (10) Patent No.: US 11,948,377 B2
Ross  (45) Date of Patent:  Apr. 2, 2024

(54) LOCAL ENCODING OF INTRINSIC AUTHENTICATION DATA

(71) Applicant: ALITHEON, INC., Bellevue, WA (US)

(72) Inventor: David Justin Ross, Bellevue, WA (US)

(73) Assignee: Alitheon, Inc., Bellevue, WA (US)

( * ) Notice: Subject to any disclaimer, the term of this patent is extended or adjusted under 35 U.S.C. 154(b) by 233 days.

(21) Appl. No.: 17/222,199

(22) Filed: Apr. 5, 2021

(65) Prior Publication Data

US 2021/0314316 A1   Oct. 7, 2021

Related U.S. Application Data

(60) Provisional application No. 63/006,059, filed on Apr. 6, 2020.

(51) Int. Cl.
*H04L 29/06* (2006.01)
*G06V 10/22* (2022.01)
(Continued)

(52) U.S. Cl.
CPC ............ *G06V 20/80* (2022.01); *G06V 10/225* (2022.01); *G06V 10/25* (2022.01); *G06V 10/462* (2022.01);
(Continued)

(58) Field of Classification Search
None
See application file for complete search history.

(56) References Cited

U.S. PATENT DOCUMENTS 4,218,674 A   8/1980   Brosow et al.
4,423,415 A   12/1983   Goldman
(Continued)

FOREIGN PATENT DOCUMENTS

DE   102006005927 A1   8/2007
EP   0439669 A2   8/1991
(Continued)

OTHER PUBLICATIONS

Extended European Search Report, dated Aug. 18, 2021, for European Application No. 21164207.9—17 pages.
(Continued)

*Primary Examiner* — Piotr Poltorak
(74) *Attorney, Agent, or Firm* — Brake Hughes Bellermann LLP (57) ABSTRACT

A device includes a processor, a machine-readable memory, and an optical capture device coupled to the processor. The processor generates a unique identifier of an object in view of the capture device. The unique identifier includes encoded information to locate a region of interest on the object, and a digital fingerprint extracted from the region of interest, locally encoding intrinsic authentication data of the object in the unique identifier. A reverse process for identification and or authentication of an object may be implement by locating an identifier on an object, recovering encoded information from the identifier, using that information to locate a region of interest, digital fingerprinting the located region of interest, and comparing the digital fingerprint to the digital fingerprint encoded in the unique identifier to obtain and present a result, without reliance on any exogenous database.

18 Claims, 3 Drawing Sheets

(51) Int. Cl.
*G06V 10/25* (2022.01)
*G06V 10/46* (2022.01)
*G06V 10/74* (2022.01)
*G06V 20/80* (2022.01)
*H04L 9/40* (2022.01)

(52) U.S. Cl.
CPC ........ *G06V 10/761* (2022.01); *H04L 63/0861* (2013.01); *H04L 63/0876* (2013.01)

(56) References Cited

U.S. PATENT DOCUMENTS

| | | |
|---|---|---|
| 4,677,435 A | 6/1987 | Causse et al. |
| 4,700,400 A | 10/1987 | Ross |
| 4,883,971 A | 11/1989 | Jensen |
| 4,921,107 A | 5/1990 | Hofer |
| 5,031,223 A | 7/1991 | Rosenbaum et al. |
| 5,079,714 A | 1/1992 | Manduley et al. |
| 5,393,939 A | 2/1995 | Nasuta et al. |
| 5,422,821 A | 6/1995 | Allen et al. |
| 5,514,863 A | 5/1996 | Williams |
| 5,518,122 A | 5/1996 | Tilles et al. |
| 5,521,984 A | 5/1996 | Denenberg et al. |
| 5,703,783 A | 12/1997 | Allen et al. |
| 5,719,939 A | 2/1998 | Tel |
| 5,734,568 A | 3/1998 | Borgendale et al. |
| 5,745,590 A | 4/1998 | Pollard |
| 5,883,971 A | 3/1999 | Bolle et al. |
| 5,923,848 A | 7/1999 | Goodhand et al. |
| 5,974,150 A | 10/1999 | Kaish et al. |
| 6,205,261 B1 | 3/2001 | Goldberg |
| 6,246,794 B1 | 6/2001 | Kagehiro et al. |
| 6,292,709 B1 | 9/2001 | Uhl et al. |
| 6,327,373 B1 | 12/2001 | Yura |
| 6,343,327 B2 | 1/2002 | Daniels et al. |
| 6,360,001 B1 | 3/2002 | Berger et al. |
| 6,370,259 B1 | 4/2002 | Hobson et al. |
| 6,400,805 B1 | 6/2002 | Brown et al. |
| 6,424,728 B1 | 7/2002 | Ammar |
| 6,434,601 B1 | 8/2002 | Rollins |
| 6,470,091 B2 | 10/2002 | Koga et al. |
| 6,539,098 B1 | 3/2003 | Baker et al. |
| 6,549,892 B1 | 4/2003 | Sansone |
| 6,597,809 B1 | 7/2003 | Ross et al. |
| 6,643,648 B1 | 11/2003 | Ross et al. |
| 6,697,500 B2 | 2/2004 | Woolston et al. |
| 6,741,724 B1 | 5/2004 | Bruce et al. |
| 6,768,810 B2 | 7/2004 | Emanuelsson et al. |
| 6,778,703 B1 | 8/2004 | Zlotnick |
| 6,805,926 B2 | 10/2004 | Cote et al. |
| 6,816,602 B2 | 11/2004 | Coffelt et al. |
| 6,829,369 B2 | 12/2004 | Poulin et al. |
| 6,961,466 B2 | 11/2005 | Imagawa et al. |
| 6,985,925 B2 | 1/2006 | Ogawa |
| 6,985,926 B1 | 1/2006 | Ferlauto et al. |
| 7,016,532 B2 | 3/2006 | Boncyk et al. |
| 7,031,519 B2 | 4/2006 | Elmenhurst |
| 7,096,152 B1 | 8/2006 | Ong |
| 7,120,302 B1 | 10/2006 | Billester |
| 7,121,458 B2 | 10/2006 | Avant et al. |
| 7,152,047 B1 | 12/2006 | Nagel |
| 7,171,049 B2 | 1/2007 | Snapp |
| 7,204,415 B2 | 4/2007 | Payne et al. |
| 7,212,949 B2 | 5/2007 | Bachrach |
| 7,333,987 B2 | 2/2008 | Ross et al. |
| 7,343,623 B2 | 3/2008 | Ross |
| 7,356,162 B2 | 4/2008 | Caillon |
| 7,379,603 B2 | 5/2008 | Ross et al. |
| 7,436,979 B2 | 10/2008 | Bruce et al. |
| 7,477,780 B2 | 1/2009 | Boncyk et al. |
| 7,518,080 B2 | 4/2009 | Amato |
| 7,602,938 B2 | 10/2009 | Prokoski |
| 7,674,995 B2 | 3/2010 | Desprez et al. |
| 7,676,433 B1 | 3/2010 | Ross et al. |
| 7,680,306 B2 | 3/2010 | Boutant et al. |
| 7,720,256 B2 | 5/2010 | Desprez et al. |
| 7,726,457 B2 | 6/2010 | Maier et al. |
| 7,726,548 B2 | 6/2010 | Delavergne |
| 7,748,029 B2 | 6/2010 | Ross |
| 7,822,263 B1 | 10/2010 | Prokoski |
| 7,834,289 B2 | 11/2010 | Orbke et al. |
| 7,853,792 B2 | 12/2010 | Cowburn |
| 8,022,832 B2 | 9/2011 | Vogt et al. |
| 8,032,927 B2 | 10/2011 | Ross |
| 8,108,309 B2 | 1/2012 | Tan |
| 8,180,174 B2 | 5/2012 | Di et al. |
| 8,180,667 B1 | 5/2012 | Baluja et al. |
| 8,194,938 B2 | 6/2012 | Wechsler et al. |
| 8,316,418 B2 | 11/2012 | Ross |
| 8,374,020 B2 | 2/2013 | Katti |
| 8,374,399 B1 | 2/2013 | Talwerdi |
| 8,374,920 B2 | 2/2013 | Hedges et al. |
| 8,391,583 B1 | 3/2013 | Mennie et al. |
| 8,428,772 B2 | 4/2013 | Miette et al. |
| 8,437,530 B1 | 5/2013 | Mennie et al. |
| 8,457,354 B1 | 6/2013 | Kolar et al. |
| 8,477,992 B2 | 7/2013 | Paul et al. |
| 8,520,888 B2 | 8/2013 | Spitzig et al. |
| 8,526,743 B1 | 9/2013 | Campbell et al. |
| 8,774,455 B2 | 7/2014 | Elmenhurst et al. |
| 8,959,029 B2 | 2/2015 | Jones et al. |
| 9,031,329 B1 | 5/2015 | Farid et al. |
| 9,058,543 B2 | 6/2015 | Campbell et al. |
| 9,152,862 B2 | 10/2015 | Ross et al. |
| 9,170,654 B1 | 10/2015 | Boncyk et al. |
| 9,224,196 B2 | 12/2015 | Duerksen et al. |
| 9,234,843 B2 | 1/2016 | Sopori et al. |
| 9,245,133 B1 | 1/2016 | Durst et al. |
| 9,350,552 B2 | 5/2016 | Elmenhurst et al. |
| 9,350,714 B2 | 5/2016 | Freeman et al. |
| 9,361,507 B1 | 6/2016 | Hoyos et al. |
| 9,361,596 B2 | 6/2016 | Ross et al. |
| 9,424,461 B1 | 8/2016 | Yuan et al. |
| 9,443,298 B2 | 9/2016 | Ross et al. |
| 9,558,463 B2 | 1/2017 | Ross et al. |
| 9,582,714 B2 | 2/2017 | Ross et al. |
| 9,646,206 B2 | 5/2017 | Ross et al. |
| 9,665,800 B1 | 5/2017 | Kuffner |
| 9,741,724 B2 | 8/2017 | Seshadri et al. |
| 10,037,537 B2 | 7/2018 | Withrow et al. |
| 10,043,073 B2 | 8/2018 | Ross et al. |
| 10,192,140 B2 | 1/2019 | Ross et al. |
| 10,199,886 B2 | 2/2019 | Li et al. |
| 10,346,852 B2 | 7/2019 | Ross et al. |
| 10,505,726 B1 | 12/2019 | Andon et al. |
| 10,540,664 B2 | 1/2020 | Ross et al. |
| 10,572,883 B2 | 2/2020 | Ross et al. |
| 10,614,302 B2 | 4/2020 | Withrow et al. |
| 10,621,594 B2 | 4/2020 | Land et al. |
| 10,740,767 B2 | 8/2020 | Withrow |
| 10,900,914 B2 * | 1/2021 | Althoefer ............... G01N 24/00 |
| 10,936,838 B1 | 3/2021 | Wong |
| 11,315,286 B2 * | 4/2022 | Azhar ................. B29C 64/205 |
| 2001/0010334 A1 | 8/2001 | Park et al. |
| 2001/0054031 A1 | 12/2001 | Lee et al. |
| 2002/0015515 A1 | 2/2002 | Lichtermann et al. |
| 2002/0073049 A1 | 6/2002 | Dutta |
| 2002/0134836 A1 | 9/2002 | Cash et al. |
| 2002/0168090 A1 | 11/2002 | Bruce et al. |
| 2003/0015395 A1 | 1/2003 | Hallowell et al. |
| 2003/0046103 A1 | 3/2003 | Amato et al. |
| 2003/0091724 A1 | 5/2003 | Mizoguchi |
| 2003/0120677 A1 | 6/2003 | Vernon |
| 2003/0138128 A1 | 7/2003 | Rhoads |
| 2003/0179931 A1 | 9/2003 | Sun |
| 2003/0182018 A1 | 9/2003 | Snapp |
| 2003/0208298 A1 | 11/2003 | Edmonds |
| 2003/0219145 A1 | 11/2003 | Smith |
| 2004/0027630 A1 | 2/2004 | Lizotte |
| 2004/0101174 A1 | 5/2004 | Sato et al. |
| 2004/0112962 A1 | 6/2004 | Farrall et al. |
| 2004/0218791 A1 | 11/2004 | Jiang et al. |
| 2004/0218801 A1 | 11/2004 | Houle et al. |
| 2004/0250085 A1 | 12/2004 | Tattan et al. |

(56) References Cited

U.S. PATENT DOCUMENTS

| | | |
|---|---|---|
| 2005/0007776 A1 | 1/2005 | Monk et al. |
| 2005/0038756 A1 | 2/2005 | Nagel |
| 2005/0065719 A1 | 3/2005 | Khan et al. |
| 2005/0086256 A1 | 4/2005 | Owens et al. |
| 2005/0111618 A1 | 5/2005 | Sommer et al. |
| 2005/0119786 A1 | 6/2005 | Kadaba |
| 2005/0125360 A1 | 6/2005 | Tidwell et al. |
| 2005/0131576 A1 | 6/2005 | De et al. |
| 2005/0137882 A1 | 6/2005 | Cameron et al. |
| 2005/0160271 A9 | 7/2005 | Brundage et al. |
| 2005/0169529 A1 | 8/2005 | Owechko et al. |
| 2005/0188213 A1 | 8/2005 | Xu |
| 2005/0204144 A1 | 9/2005 | Mizutani |
| 2005/0251285 A1 | 11/2005 | Boyce et al. |
| 2005/0257064 A1 | 11/2005 | Boutant et al. |
| 2005/0289061 A1 | 12/2005 | Kulakowski et al. |
| 2006/0010503 A1 | 1/2006 | Inoue et al. |
| 2006/0083414 A1 | 4/2006 | Neumann et al. |
| 2006/0109520 A1 | 5/2006 | Gossaye et al. |
| 2006/0131518 A1 | 6/2006 | Ross et al. |
| 2006/0177104 A1 | 8/2006 | Prokoski |
| 2006/0253406 A1 | 11/2006 | Caillon |
| 2007/0056041 A1 | 3/2007 | Goodman |
| 2007/0071291 A1 | 3/2007 | Yumoto et al. |
| 2007/0085710 A1 | 4/2007 | Bousquet et al. |
| 2007/0094155 A1 | 4/2007 | Dearing |
| 2007/0211651 A1 | 9/2007 | Ahmed et al. |
| 2007/0211964 A1 | 9/2007 | Agam et al. |
| 2007/0230656 A1 | 10/2007 | Lowes et al. |
| 2007/0263267 A1 | 11/2007 | Ditt |
| 2007/0269043 A1 | 11/2007 | Launay et al. |
| 2007/0282900 A1 | 12/2007 | Owens et al. |
| 2008/0005578 A1 | 1/2008 | Shafir |
| 2008/0008377 A1 | 1/2008 | Andel et al. |
| 2008/0011841 A1 | 1/2008 | Self et al. |
| 2008/0013804 A1 | 1/2008 | Moon et al. |
| 2008/0016355 A1 | 1/2008 | Beun et al. |
| 2008/0128496 A1 | 6/2008 | Bertranou et al. |
| 2008/0130947 A1 | 6/2008 | Ross et al. |
| 2008/0219503 A1 | 9/2008 | Di et al. |
| 2008/0250483 A1 | 10/2008 | Lee |
| 2008/0255758 A1 | 10/2008 | Graham et al. |
| 2008/0272585 A1 | 11/2008 | Conard et al. |
| 2008/0290005 A1 | 11/2008 | Bennett et al. |
| 2008/0294474 A1 | 11/2008 | Furka |
| 2009/0028379 A1 | 1/2009 | Belanger et al. |
| 2009/0057207 A1 | 3/2009 | Orbke et al. |
| 2009/0106042 A1 | 4/2009 | Maytal et al. |
| 2009/0134222 A1 | 5/2009 | Ikeda |
| 2009/0154778 A1 | 6/2009 | Lei et al. |
| 2009/0157733 A1 | 6/2009 | Kim et al. |
| 2009/0223099 A1 | 9/2009 | Versteeg |
| 2009/0232361 A1 | 9/2009 | Miller |
| 2009/0245652 A1 | 10/2009 | Bastos |
| 2009/0271029 A1 | 10/2009 | Doutre |
| 2009/0283583 A1* | 11/2009 | Cowburn ............ G06Q 10/087 235/494 |
| 2009/0287498 A2 | 11/2009 | Choi |
| 2009/0307005 A1 | 12/2009 | Omartin et al. |
| 2010/0027834 A1 | 2/2010 | Spitzig et al. |
| 2010/0054551 A1 | 3/2010 | Decoux |
| 2010/0070527 A1 | 3/2010 | Chen |
| 2010/0104200 A1 | 4/2010 | Baras et al. |
| 2010/0157064 A1 | 6/2010 | Cheng et al. |
| 2010/0163612 A1 | 7/2010 | Caillon |
| 2010/0166303 A1 | 7/2010 | Rahimi |
| 2010/0174406 A1 | 7/2010 | Miette et al. |
| 2010/0286815 A1 | 11/2010 | Zimmermann |
| 2011/0026831 A1 | 2/2011 | Perronnin et al. |
| 2011/0064279 A1 | 3/2011 | Uno |
| 2011/0081043 A1 | 4/2011 | Sabol et al. |
| 2011/0091068 A1 | 4/2011 | Stuck et al. |
| 2011/0161117 A1 | 6/2011 | Busque et al. |
| 2011/0188709 A1 | 8/2011 | Gupta et al. |
| 2011/0194780 A1 | 8/2011 | Li et al. |
| 2011/0235920 A1 | 9/2011 | Iwamoto et al. |
| 2011/0248827 A1* | 10/2011 | Bertoncini ............ H04L 9/3226 340/10.1 |
| 2011/0267192 A1 | 11/2011 | Goldman et al. |
| 2012/0042171 A1 | 2/2012 | White et al. |
| 2012/0089639 A1 | 4/2012 | Wang |
| 2012/0130868 A1 | 5/2012 | Loeken |
| 2012/0177281 A1 | 7/2012 | Frew |
| 2012/0185393 A1 | 7/2012 | Atsmon et al. |
| 2012/0199651 A1 | 8/2012 | Glazer |
| 2012/0242481 A1 | 9/2012 | Gernandt et al. |
| 2012/0243797 A1 | 9/2012 | Di Venuto Dayer et al. |
| 2012/0250945 A1 | 10/2012 | Peng et al. |
| 2013/0110719 A1 | 5/2013 | Carter et al. |
| 2013/0162394 A1 | 6/2013 | Etchegoyen |
| 2013/0212027 A1 | 8/2013 | Sharma et al. |
| 2013/0214164 A1 | 8/2013 | Zhang et al. |
| 2013/0273968 A1 | 10/2013 | Rhoads et al. |
| 2013/0277425 A1 | 10/2013 | Sharma et al. |
| 2013/0284803 A1 | 10/2013 | Wood et al. |
| 2014/0032322 A1 | 1/2014 | Schwieger et al. |
| 2014/0140570 A1 | 5/2014 | Ross et al. |
| 2014/0140571 A1 | 5/2014 | Elmenhurst et al. |
| 2014/0184843 A1 | 7/2014 | Campbell et al. |
| 2014/0201094 A1 | 7/2014 | Herrington et al. |
| 2014/0270341 A1 | 9/2014 | Elmenhurst et al. |
| 2014/0314283 A1 | 10/2014 | Harding |
| 2014/0380446 A1 | 12/2014 | Niu et al. |
| 2015/0058142 A1 | 2/2015 | Lenahan et al. |
| 2015/0067346 A1 | 3/2015 | Ross et al. |
| 2015/0078629 A1 | 3/2015 | Gottemukkula et al. |
| 2015/0086068 A1 | 3/2015 | Mulhearn et al. |
| 2015/0110364 A1 | 4/2015 | Niinuma et al. |
| 2015/0117701 A1 | 4/2015 | Ross et al. |
| 2015/0127430 A1 | 5/2015 | Hammer |
| 2015/0248587 A1 | 9/2015 | Oami et al. |
| 2015/0294189 A1 | 10/2015 | Benhimane et al. |
| 2015/0309502 A1 | 10/2015 | Breitgand et al. |
| 2015/0371087 A1 | 12/2015 | Ross et al. |
| 2016/0034913 A1 | 2/2016 | Zavarehi et al. |
| 2016/0034914 A1 | 2/2016 | Gonen et al. |
| 2016/0055651 A1 | 2/2016 | Oami |
| 2016/0057138 A1 | 2/2016 | Hoyos et al. |
| 2016/0072626 A1 | 3/2016 | Kouladjie |
| 2016/0117631 A1 | 4/2016 | McCloskey et al. |
| 2016/0162734 A1 | 6/2016 | Ross et al. |
| 2016/0180485 A1 | 6/2016 | Avila et al. |
| 2016/0180546 A1 | 6/2016 | Kim et al. |
| 2016/0189510 A1 | 6/2016 | Hutz |
| 2016/0203387 A1 | 7/2016 | Lee et al. |
| 2016/0300234 A1 | 10/2016 | Moss-Pultz et al. |
| 2016/0335520 A1 | 11/2016 | Ross et al. |
| 2017/0004444 A1 | 1/2017 | Krasko et al. |
| 2017/0032285 A1 | 2/2017 | Sharma et al. |
| 2017/0076132 A1 | 3/2017 | Sezan et al. |
| 2017/0132458 A1 | 5/2017 | Short et al. |
| 2017/0153069 A1 | 6/2017 | Huang et al. |
| 2017/0243230 A1 | 8/2017 | Ross et al. |
| 2017/0243231 A1 | 8/2017 | Withrow et al. |
| 2017/0243232 A1 | 8/2017 | Ross et al. |
| 2017/0243233 A1 | 8/2017 | Land et al. |
| 2017/0249491 A1 | 8/2017 | Macintosh et al. |
| 2017/0251143 A1 | 8/2017 | Peruch et al. |
| 2017/0253069 A1 | 9/2017 | Kerkar et al. |
| 2017/0295301 A1 | 10/2017 | Liu et al. |
| 2017/0300905 A1 | 10/2017 | Withrow et al. |
| 2017/0344823 A1 | 11/2017 | Withrow et al. |
| 2017/0344824 A1 | 11/2017 | Martin |
| 2017/0372327 A1 | 12/2017 | Withrow |
| 2018/0000359 A1 | 1/2018 | Watanabe |
| 2018/0012008 A1 | 1/2018 | Withrow et al. |
| 2018/0018627 A1 | 1/2018 | Ross et al. |
| 2018/0018838 A1 | 1/2018 | Fankhauser et al. |
| 2018/0024074 A1 | 1/2018 | Ranieri et al. |
| 2018/0024178 A1 | 1/2018 | House et al. |
| 2018/0047128 A1 | 2/2018 | Ross et al. |
| 2018/0053312 A1* | 2/2018 | Ross .................. G06F 16/5838 |
| 2018/0121643 A1 | 5/2018 | Talwerdi et al. |
| 2018/0144211 A1 | 5/2018 | Ross et al. |

(56) References Cited

U.S. PATENT DOCUMENTS

| | | |
|---|---|---|
| 2018/0315058 A1 | 11/2018 | Withrow et al. |
| 2018/0349694 A1 | 12/2018 | Ross et al. |
| 2019/0026581 A1 | 1/2019 | Leizerson |
| 2019/0034518 A1 | 1/2019 | Liu et al. |
| 2019/0034694 A1 | 1/2019 | Ross |
| 2019/0102873 A1 | 4/2019 | Wang et al. |
| 2019/0102973 A1 | 4/2019 | Oyama et al. |
| 2019/0130082 A1 | 5/2019 | Alameh et al. |
| 2019/0228174 A1 | 7/2019 | Withrow et al. |
| 2019/0266373 A1 | 8/2019 | Hirokawa |
| 2019/0279017 A1 | 9/2019 | Graham et al. |
| 2019/0287118 A1 | 9/2019 | Ross et al. |
| 2019/0342102 A1 | 11/2019 | Hao et al. |
| 2019/0362186 A1 | 11/2019 | Irshad et al. |
| 2020/0153822 A1 | 5/2020 | Land et al. |
| 2020/0226366 A1 | 7/2020 | Withrow et al. |
| 2020/0233901 A1 | 7/2020 | Crowley et al. |
| 2020/0250395 A1 | 8/2020 | Ross et al. |
| 2020/0257791 A1 | 8/2020 | Shannon et al. |
| 2020/0334689 A1 | 10/2020 | Withrow |
| 2020/0349379 A1 | 11/2020 | Ross |
| 2020/0356772 A1 | 11/2020 | Withrow et al. |

FOREIGN PATENT DOCUMENTS

| | | |
|---|---|---|
| EP | 0759596 A2 | 2/1997 |
| EP | 1016548 A2 | 7/2000 |
| EP | 1016549 A1 | 7/2000 |
| EP | 1719070 B1 | 4/2009 |
| EP | 2107506 A1 | 10/2009 |
| EP | 2166493 A1 | 3/2010 |
| EP | 2195621 B1 | 11/2013 |
| EP | 2866193 A1 | 4/2015 |
| EP | 2257909 B1 | 5/2015 |
| EP | 2869240 A2 | 5/2015 |
| EP | 2869241 A2 | 5/2015 |
| EP | 3208744 A1 | 8/2017 |
| EP | 3249581 A1 | 11/2017 |
| EP | 3267384 A1 | 1/2018 |
| EP | 3270342 A1 | 1/2018 |
| EP | 3435287 A2 | 1/2019 |
| EP | 3514715 A1 | 7/2019 |
| GB | 2097979 A | 11/1982 |
| GB | 2482127 A | 1/2012 |
| JP | 61234481 A | 10/1986 |
| JP | H07192112 | 7/1995 |
| JP | 2007213148 A | 8/2007 |
| JP | 2010146158 A | 7/2010 |
| KR | 20120009654 A | 2/2012 |
| WO | 2005086616 A2 | 9/2005 |
| WO | 2006038114 A1 | 4/2006 |
| WO | 2007028799 A1 | 3/2007 |
| WO | 2007031176 A1 | 3/2007 |
| WO | 2007071788 A1 | 6/2007 |
| WO | 2007090437 A1 | 8/2007 |
| WO | 2007144598 A1 | 12/2007 |
| WO | 2009030853 A1 | 3/2009 |
| WO | 2009089126 A1 | 7/2009 |
| WO | 2009115611 A2 | 9/2009 |
| WO | 2010018464 A2 | 2/2010 |
| WO | 2010018646 A1 | 2/2010 |
| WO | 2012145842 A1 | 11/2012 |
| WO | 2013051019 A1 | 4/2013 |
| WO | 2013126221 A1 | 8/2013 |
| WO | 2013173408 A1 | 11/2013 |
| WO | 2015004434 A1 | 1/2015 |
| WO | 2016081831 A1 | 5/2016 |

OTHER PUBLICATIONS

Extended European Search Report, dated Aug. 18, 2021, for European Application No. 21164207.9, 13 pages.

Extended European Search Report, dated Aug. 19, 2021, for European Application No. 21164353.1, 9 pages.

Non-Final Office Action Issued in U.S. Appl. No. 16/553,943, dated Sep. 1, 2021, 13 pages.

Non-Final Office Action Issued in U.S. Appl. No. 16/827,701, dated Aug. 17, 2021, 19 pages.

Non-Final Office Action Issued in U.S. Appl. No. 16/866,468, dated Sep. 9, 2021, 24 pages.

Non-Final Office Action Issued in U.S. Appl. No. 16/872,202, dated Sep. 24, 2021, 24 pages.

Hensler, J., et al., "Hybrid Face Recognition Based on Real-time Multi-camera Stereo-Matching", ICIAP: International Conference on Image Analysis and Processing, 17th International Conference, Naples, Italy, Sep. 9-13, 2013, 10 pages.

Scott, Von Duhn, et al., "Three-View Surveillance Video Based Face Modeling For Recognition", Biometrics Symposium, 2007, IEEE, Pi, Sep. 30, 2007, 6 pages XP031202430.

Anonymous, "Intrinsic Characteristics for Authentication" & "Alp Vision Advances Security Through Digital Technology," Authentication News vol. 12, (No. 9) pp. 2, 7 and 8, dated Sep. 2006, 3 pages total.

Bao et al., "Local Feature based Multiple Object Instance Identification using Scale and Rotation Invariant Implicit Shape Model," 12th Asian Conference on Computer Vision, Singapore, Singapore, Nov. 1-5, 2014, pp. 600-614.

Beekhof et al., "Secure Surface Identification Codes," Proceeding of the SPIE 6819: Security Forensics, Steganography, and Watermarking of Multimedia Contents X:68190D, 2008. (12 pages).

Buchanan et al., "Fingerprinting documents and packaging," Nature 436 (7050): 475, 2005.

Cavoukian et al. "Biometric Encryption: Technology for Strong Authentication, Security and Privacy," 2008, WE, Intl. Fed. Iot Info Processing, vol. 261; Policies and Research in Identity Management; pp. 57-77.

Di Paola et al., "An Autonomous Mobile Robotic System for Surveillance of Indoor Environments," International Journal of Advanced Robotic Systems 7(1): 19-26, 2010.

Drew, M. S., et al., "Sharpening from Shadows: Sensor Transforms for Removing Shadows using a Single Image," Color and Imaging Conference, vol. 5, Society for Imaging Science and Technology, 2009, pp. 267-271.

Ebay, "eBay Launches Must-Have !Phone App Red Laser 3.0" published Nov. 18, 2011; https://www.ebayinc.com/stories/news/ebay-launches-must-have-iphone-app-redlaser-30/, downloaded Mar. 21, 2019, 7 pages).

Entropy.com Website History, Wayback Machine; https://web.archive.org/web/20160330060808/https://www.entrupy.com/; Mar. 30, 2016 (Year: 2016), 2 pages.

Extended European Search Report Application No. 21153877.2, dated Jun. 15, 2021, 8 pages.

Extended European Search Report, dated Jun. 18, 2021, for European Application No. 21153355.9, 8 pages.

Farid, "Digital Image Forensics", Dartmouth CS 89/189, Sprint 2013; 199 pages.

Fischler et al., "Random Sample Consensus: A Paradigm for Model Fitting with Applications to Image Analysis and Automated Cartography," Communication of the ACM 24(6); 381-395, 1981.

Huang et al., "A Novel Binarization Algorithm for Ballistic Imaging Systems," 3rd International Congress on Image and Signal Processing, Yantai, China, Oct. 16-18, 2010, pp. 1287-1291.

Huang, et al., "An Online Ballistics Imaging System for Firearm Identification"; 2nd International Conference on Signal Processing Systems, Dalian, China, Jul. 5-7, 2010, vol. 2, pp. 68-72.

Kartik et al., "Security System with Face Recognition, SMS Alert and Embedded Network Video Monitoring Terminal," International Journal of Security, Privacy and Trust Management 2(5):9-19, 2013.

Li, "Image Processing for the Positive Identification of Forensic Ballistics Specimens," Proceedings of the 6th International Conference of Information Fusion, Cairns, Australia, Jul. 8-11, 2003, pp. 1494-1498.

Li, "Firearm Identification System Based on Ballistics Image Processing," Congress on Image and Signal Processing, School of Computer and Information Science, Faculty of Computing, Health and Science Edith Cowan University, Perth, Australia pp. 149-154.

(56) References Cited

OTHER PUBLICATIONS

Maddern et al., "Illumination Invariant Imaging: Applications in Robust Vision-based Localization, Mapping and Classification for Autonomous Vehicles," IEEE International Conference on Robotics and Automation, Hong Kong, May 31-Jun. 7, 2014, 8 pages.

Matsumoto et al., "Nano-artifact metrics based on random collapse of resist," Scientific Reports 4:6142, 2014 (5 pages).

Mistry et al., "Comparison of Feature Detection and Matching Approaches: SIFT and SURF," Global Research and Development Journal for Engineering, vol. 2, Issue 4, Mar. 2017, 8 pages.

Online NCOALink ® Processing Acknowledgement Form (PAF) Released by Lorton Data, Jun. 2, 2009, URL=http://us.generation-nt.com/online-ncoalink-processingacknowledgement-form-paf-released-by-press-1567191.html, download date Jun. 25, 2010, 2 pages.

Rublee et al., "ORB: an efficient alternative to SIFT or Surf," IEEE International Conference on Computer Vision, Barcelona, Spain, Nov. 6-13, 2011, 8 pages.

Schneider et al., "A Robust Content Based Digital Signature for Image Authentication," Proceeding of the International Conference on Image Processing Lausanne, Switzerland, Sep. 19, 1996, pp. 227-230.

Schwabe Williamson & Wyatt, PC—Listing of Related Cases; dated Sep. 16, 2017; 2 pages.

Sharma et al., "The Fake vs Real Goods Problem: Microscopy and Machine Learning to the Rescue," KDD 2017 Applied Data Science Paper, Aug. 13-17, 2017, Halifax, NS, Canada, 9 pages.

Shi et al., "Smart Cameras: Fundamentals and Classification," Chapter 2, Belbachir (ed.), Smart Cameras, Springer, New York, New York, USA 2010, pp. 19-34.

Shields, "How To Shop Savvy With Red Laser," published online on Mar. 22, 2010; https ://i phone .appstomn .net/ reviews/lifesty le/how-to-shop-savvy-with-redlaser /, downloaded Mar. 22, 2010, 8 pages).

Smith, "Fireball: A Forensic Ballistic Imaging System: Proceedings of the 31st Annual International Carnahan Conference on Security Technology," Canberra, Australia, Oct. 15-17, 1997, pp. 64-70.

Takahashi et al., "Mass-produced Parts Traceability System Based on Automated Scanning of Fingerprint of Things," 15th IAPR International Conference on Machine Vision Applications, Nagoya, Japan, May 8-12, 2017, 5 pages.

United States Postal Service, "NCOALink Systems", http:/ /www.usps.com/ncsc/addressservices/moveupdate/changeaddress.htm, website accessed Jun. 23, 2010, 2 pages.

United States Postal Service, "Postal Addressing Standards," Publication Jul. 28, 2008, 55 pages.

United States Postal Services, NCOALink® Systems, dated May 27, 2009, URL=http://ribbs.usps.gov/ncoalink/ncoalink_print.htm, download date Jun. 23, 2010, 3 pages.

Veena et al., "Automatic Theft Security System (Smart Surveillance Camera)," Computer Science & Information Technology 3:75-87, 2013.

Woods, "Counterfeit-spotting truth machine launches out of Dumbo," published online on Feb. 11, 2016, downloaded from http://technically/brooklyn/2016/02/11/entrupy-counterfeit-scanner/ on Mar. 20, 2019, 3 pages.

Farid, Ahmed, et al., "Integrated fingerprint verification method using a composite signature-based watermarking technique", Optical Engineering, The Catholic University of America, (Year: 2007), 6 pages.

Jain, Anil K, et al., "Biometric Cryptosystems: Issues and Challenges", Proceedings of the IEEE, IEEE, New York, US, vol. 92, No. 6, Jun. 1, 2004, XP011112757, pp. 948-960.

Truong, Hieu C, et al., "Royal Canadian Mint/Signoptic Technologies Coin DNA Technology", World Money Fair (WMF) Berlin Feb. 1-3, 2011, http://www.amisdeleuro.org/upload/1340734488.pptx, 22 pages.

Zaeri, Naser, "Minutiae-based Fingerprint Extraction and Recognition, 2020 (year 2010)", 47 pages.

\* cited by examiner

LOCAL ENCODING OF INTRINSIC AUTHENTICATION DATA

RELATED APPLICATIONS

This application is related to LOCAL ENCODING OF INTRINSIC AUTHENTICATION DATA, U.S. Pat. App. No. 63/006,059 filed Apr. 6, 2020, and which is incorporated herein by reference.

COPYRIGHT NOTICE

COPYRIGHT © 2018-2021 Alitheon, Inc. A portion of the disclosure of this document contains material which is subject to copyright protection. The copyright owner has no objection to the facsimile reproduction by anyone of the document or the disclosure, as it appears in the Patent and Trademark Office file or records, but otherwise reserves all copyright rights whatsoever. 37 C.F.R. § 1.71(d) (2017).

TECHNICAL FIELD

This application pertains to methods, systems and software to apply a novel identifier to an item such as a physical object. That identifier is unique for each item or for each set of items and contains information about contents of authentication regions of the object useful for reliable, machine-implemented identification and or authentication of the object.

BACKGROUND

Significant efforts are made each year to prevent or inhibit the counterfeiting of items of value. One of the simplest and most common techniques is to apply a unique identifier or "ID" (often in the form of a 1-D or 2-D machine-readable symbol commonly referred to as a barcode symbol) to the item. When a person seeking to authenticate the object (we use "object" and "item" interchangeably in this document) scans the barcode symbol with, for example, a phone app, the app reads the barcode symbol, connects to an online site, and affirms that an object with the barcode symbol was manufactured by a particular producer, or otherwise may provide provenance information or other metadata.

With known unique identifiers, the identifier intrinsically contains no information about the object. The connection of the identifier with the object is through their exogenous association in a database, for example. In other words, a common way to use a barcode symbol, RFID transponder, or other ID is to start with a more-or-less random number or other code that contains no intrinsic information other than being suitable for use as an index into a database where data extracted from the object (e.g., digital fingerprints) and metadata about the object are associated with it. The ID then becomes a way to access the data and metadata about the item in the database. This approach for making such an index means that a copy of the object yields the same information from the database and authenticates just as well as the original so that the copy, if the associated database record is queried first, erroneously gets the authentication certification.

In other words, if, subsequently, someone attempts to authenticate another item with the same barcode symbol, the system knows that barcode symbol has already been authenticated and will reject the new item. The obvious problem with this approach is that the system has no way of knowing which of the two items is the copy, and which, if either, the original. Further, the above-described approach, as well as many other forms of item authentication, require the user or an application to connect to an online database in order to operate. If no connectivity is available, all attempts at authentication will fail.

There are other forms of anti-counterfeiting technology that do not require online connectivity. The paper fibers and special inks in bank notes, the capsules and coded corks on wine bottles, and many more fit into this category. As counterfeiters have become more capable in reproducing such features, manufacturers have had to add more and more such items to their goods. This has resulted in an arms race between producers and manufacturers. Complexity upon complexity has been added to items, with the results that ordinary users are unable to distinguish legitimate items from counterfeits.

The need remains for improvements in anti-counterfeiting technology to overcome the above problems associated with duplication of bar codes or other identifiers. The need also remains for improvements in anti-counterfeiting technology to obviate the need for external (say, network) connectivity to remote database resources. And the need remains for improvements in anti-counterfeiting technology to avoid increasingly complex and expensive solutions and improve user convenience.

SUMMARY OF THE PRESENT DISCLOSURE

The following is a summary of the present disclosure to provide a basic understanding of some features and context. This summary is not intended to identify key or critical elements of the disclosure or to delineate the scope of the disclosure. Its sole purpose is to present some concepts of the present disclosure in simplified form as a prelude to a more detailed description that is presented later.

Copying of an authentication machine-readable symbol (commonly referred to as a barcode symbol) or other item: The improvements described herein have at least two properties that make it exempt from the copying problems outlined above. First, the unique identifier taught in this disclosure has inherent content, not just content assigned to it through its use as, say, an index into a database. That unique content in a preferred embodiment comprises an encoding of item digital fingerprints, templates, etc. Second, inherent features of the item (such as paper fibers and ink bleeds) are used to produce those digital fingerprints and a copy does not have the same innate features as the original. As a result, the taught approach does not suffer from the second-to-authenticate problems since a copy will not authenticate at all. The unique identifier (or simply, "identifier"), for example, a number/number-letter combination may be printed onto a physical object or on a label on the object.

Connectivity failure: Because the location of and the digital fingerprints of the authentication region(s) of interest are encoded in the unique identifier, reading the unique identifier and extracting the digital fingerprints from the region(s) of interest and then comparing them are sufficient, when taken together, to authenticate the item without requiring external connectivity. The teachings of this disclosure are thus exempt from connectivity problems.

Complexity arms race: No amount of added complexity—be it special inks, clever logos, multiple hidden features—can secure an item against counterfeiting. Anything that can be intentionally created by one person can be intentionally recreated by another. The approach taught here, however, uses the complexity innate to the object (such as its physical structure at multiple scales) and accidents of its manufacture (such as machining marks and ink bleeds) to ensure against copying or duplication. The use of an available application (for instance on a smart phone) for extracting that complexity means that it is no longer up to the user (who is often ill equipped to do so) to ascertain whether the item has all the proper anti-counterfeiting add-ons.

Together, these considerations provide a system that allows authentication of an object that is less sensitive to copying than existing techniques, that does not require online connectivity to function effectively, and that does not require the end user to be an expert in anti-counterfeiting techniques.

This brief summary has been provided to describe certain concepts in a simplified form that are further described in more detail in the Detailed Description. The Brief Summary does not limit the scope of the claimed subject matter, but rather the words of the claims themselves determine the scope of the claimed subject matter.

BRIEF DESCRIPTION OF THE DRAWINGS

Drawing figures are appended to illustrate some aspects of the present disclosure. The drawings are simplified representations of selected systems, methods and aspects; they are not intended to be limiting.

DETAILED DESCRIPTION OF PREFERRED EMBODIMENTS

Reference will now be made in detail to embodiments of the inventive concept, examples of which are illustrated in the accompanying drawings. The accompanying drawings are not necessarily drawn to scale. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first machine could be termed a second machine, and, similarly, a second machine could be termed a first machine, without departing from the scope of the inventive concept.

It will be further understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

The terminology used in the description of the inventive concept herein is for the purposes of describing illustrative embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed objects.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As a preliminary matter, some of the terms used above, such as fingerprints (short for digital fingerprints) and authentication regions are described in detail later. A digital fingerprint is also sometimes called a "FeaturePrint." FeaturePrint is a trademark of applicant Alitheon, Inc.

Reading a machine-readable symbol (used interchangeably with the terms bar code and barcode symbol or interrogating (used interchangeably with the term pinging) an RFID transponder (used interchangeably with the term RFID tag), for example by connecting to a remote database, are becoming more familiar acts for people seeking to ascertain that the items they have purchased are authentic. The presently disclosed improvements remove several of the limitations inherent in current approaches. Among the novel aspects taught by this disclosure are the following:

Coded in the unique identifier is information, accessible by an application, that tells the application the location(s) in the image of the object from which the fingerprint is to be extracted, along with other data to be used for authentication. The image data is captured by a camera or other image capture or scanner device (see infra) while the physical object or at least a part of it is within the field of view of the camera, imager or scanner (the terms camera, imager, scanner and image sensor are used interchangeably herein). That said, the present disclosure is not limited to optical scanning; for example, see below regarding radio techniques like RFID interrogation.

The application refers to a software application which may comprise, in some embodiments, an application program or "app" executable in a smartphone or other portable device. In other embodiments, the device need not be portable; it may comprise a kiosk or fixed terminal.

The location from which to extract the fingerprint can be a single region or a more complex template. In other words, a template may be coded in the unique identifier that specifies multiple locations or regions to be inspected or captured. These are sometimes called regions of interest. The template or region of interest can be localized in many ways, some of which are described in the companion patent application described in the next paragraph. In some embodiments, a region of interest may be specified (in the identifier) as an offset from the unique identifier. The captured image data may be processed using this location information to generate a digital fingerprint for authentication of the object.

The teachings of this disclosure may be combined with those of our other patent application, Automated Authentication Region Localization and Capture, No. 62/842,444 filed May 2, 2019. In that case, a process focuses in on, say, a logo or other "anchor region" that a user can find without difficulty on an object. In that disclosure, there is nothing in the anchor region that says where the authentication region is. The database knows based on what it has been told is being authenticated and from having the anchor region's contents as a starting point for offsetting and scaling to find the authentication region for fingerprint feature extraction. In the present case, the unique identifier on the object encodes where to find the authentication region(s).

If the region of interest is not already captured in the image data, the application may then tell the user where to focus the camera to acquire the region or regions of interest or the camera may be caused to automatically capture an image that at least includes the region or regions of interest, for example, by automatically directing, orienting and/or focusing the camera, scanner or other imager. The application decodes the data and then causes the camera, scanner or other imager or image sensor to capture one or more images of the desired area or areas, and then extracts authenticating information from the captured image(s).

Also coded in the unique identifier is authentication data that was extracted from the fingerprinted region of the object when the unique identifier was created. If that information matches sufficiently well to the authenticating information extracted at a later time as described above, the identity or authenticity of the item is established. This match need not be perfect. Matching is described in more detail later. No external connection to a reference database is required since all the required information is encoded locally. The encoding and representation of that information in the unique identifier can be accomplished through many methods known in the art.

Using a radio or a visible authentication method: The techniques taught here do not require any particular form of authenticating information. So long as that information is intrinsic to the object, can be extracted, added to the unique ID then later re-extracted when authentication is required, the approach is covered by this patent. For example, it is possible to use random or pseudorandom RFID (or other non-visual pinging) characteristics as a fingerprint. These characteristics are encoded and a unique identifier containing that information placed on the object. In general, any form of item ID that can contain information unique to and/or inherent in that particular object (or set of objects) is in view here.

Figure 1:
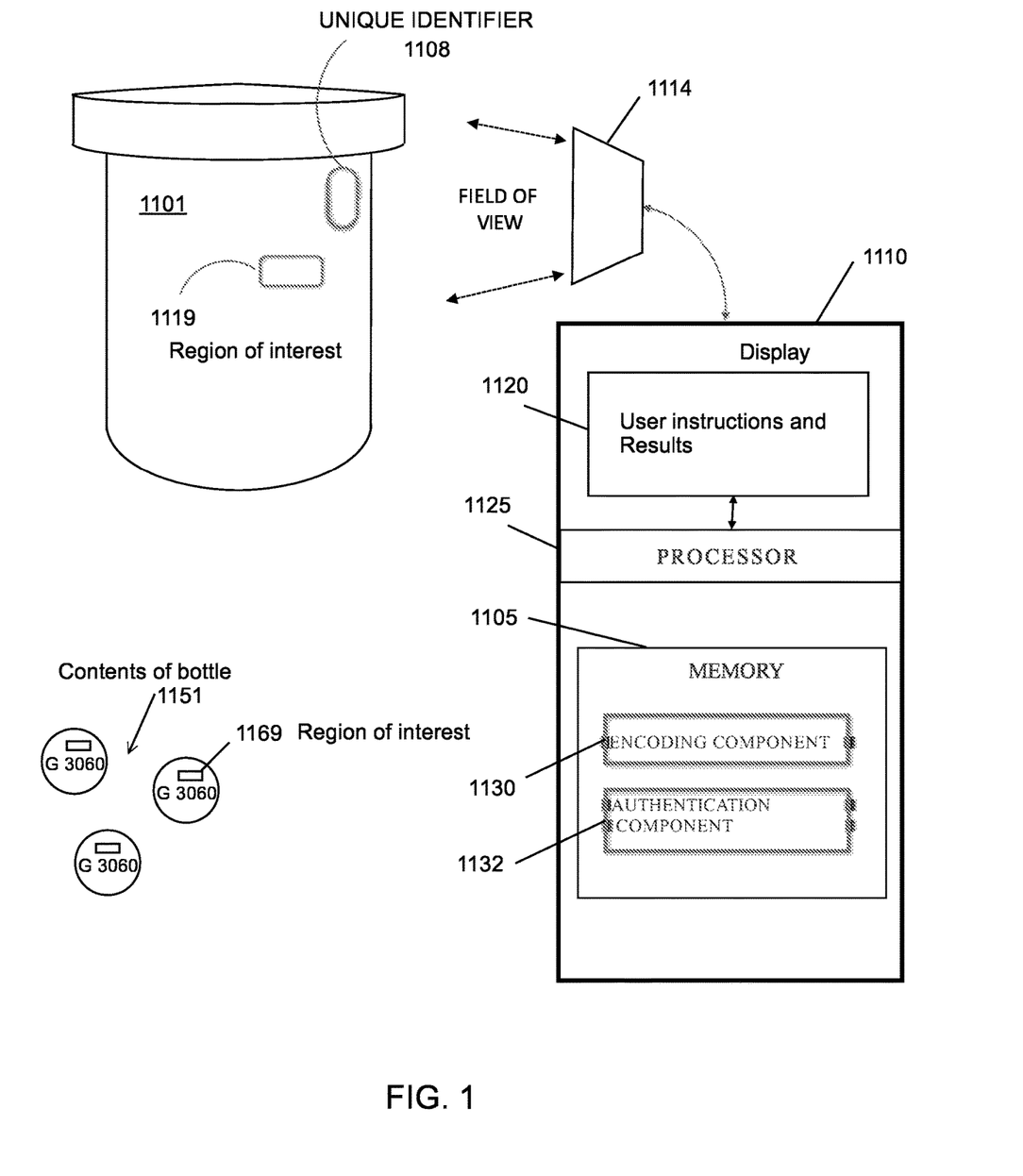
FIG. 1 is a simplified conceptual diagram illustrating aspects of one embodiment of the present disclosure.

FIG. 1 is a simplified conceptual diagram illustrating aspects of one embodiment of the present disclosure. In this illustration, a physical object, for example, a bottle 1101 has an applied unique identifier 1108. The identifier, which may comprise, for example, a visible indicator, RFID tag, or the like, stores encoded information as described above. In an embodiment, the encoded information may identify a region of interest 1119 on the bottle 1101, i.e. specify its location.

The bottle may have content items 1151 such as items each labeled "G 3060." That identifier is obviously not unique and serves no purpose here. Each content item also may have a region of interest, for example, 1169, which can be used to uniquely identify each individual item. In an embodiment, the identifier 1108 on the bottle may encode information for locating, capturing and processing the individual content item regions of interest.

An apparatus 1110, for example, a smartphone or a fixed machine, preferably includes or is coupled to a scanner 1114 which may comprise one or more cameras, RFID transceivers, etc. The scanner device, in operation, is arranged to capture an image of the bottle 1101 that includes the identifier 1108 and the region of interest 1119. The apparatus 1110 preferably includes a display 1120 which may present user instructions such as feedback to the user for image capture ("get closer") and or display match (authentication) results. Of course, generated instructions may be audible.

In an embodiment, the apparatus 1110 may include a processor 1125 operatively coupled to the display 1120. The processor is further coupled to a memory 1105. The memory stores instructions executable on the processor, the executable instructions including an encoding component 1130 and an authentication component 1132.

In some embodiments, the "unique identifier" may specify where to look to get the image to be used for authentication, as well as how many of the feature vectors of that region are sufficient to generate a positive authentication result.

Metadata recovered by the processor 1105 may include, for example, information about contents of the item (e.g. the wine in the bottle), manufacturing data, etc. In general, "metadata" does not include the identifying information such as the digital fingerprint. Rather, it includes information on the object such as who made it, where, when, and so on. It may, for example, include a URL to look online to find additional data.

Figure 2:
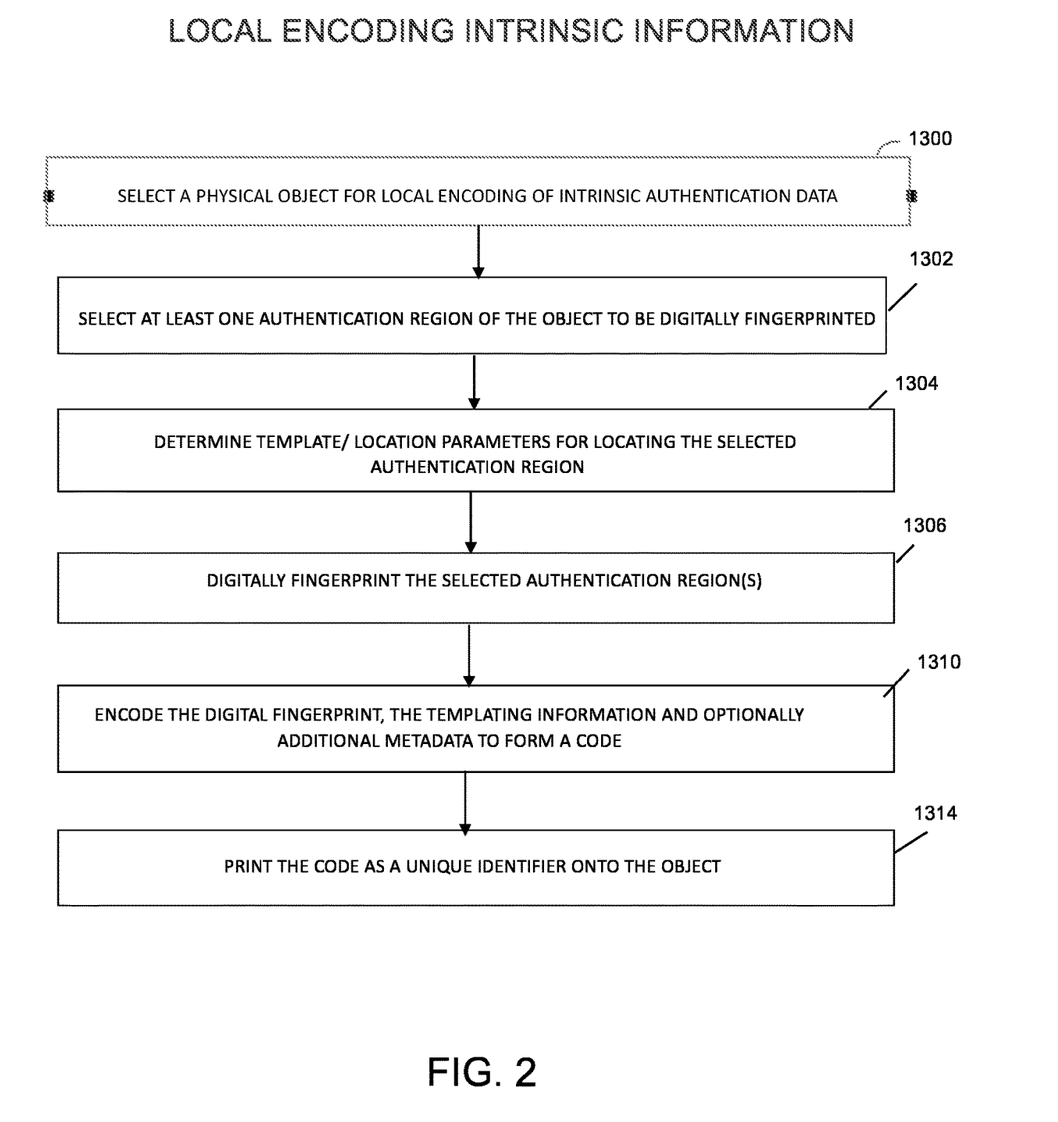
FIG. 2 is a simplified flow diagram of one example process to generate a unique identifier to apply to an object to implement local encoding of intrinsic authentication data.

FIG. 2 is a simplified flow diagram of one example process to generate a unique identifier for a physical object. Here, the process calls for first selecting a physical object for local encoding of intrinsic authentication data, act 1300. Next, selecting at least one authentication region of the object to be digitally fingerprinted, act 1302. Then, determining template/location parameters for locating the selected authentication region, act 1304. Further, the process proceeds to digitally fingerprinting the selected authentication region(s), act 1306. Next, encoding the digital fingerprint, the templating information and optionally additional metadata to form a code, act 1310. And finally, printing the code as a unique identifier onto the object, act 1314. These acts may be carried out in an apparatus such as illustrated in FIG. 1.

Figure 3:
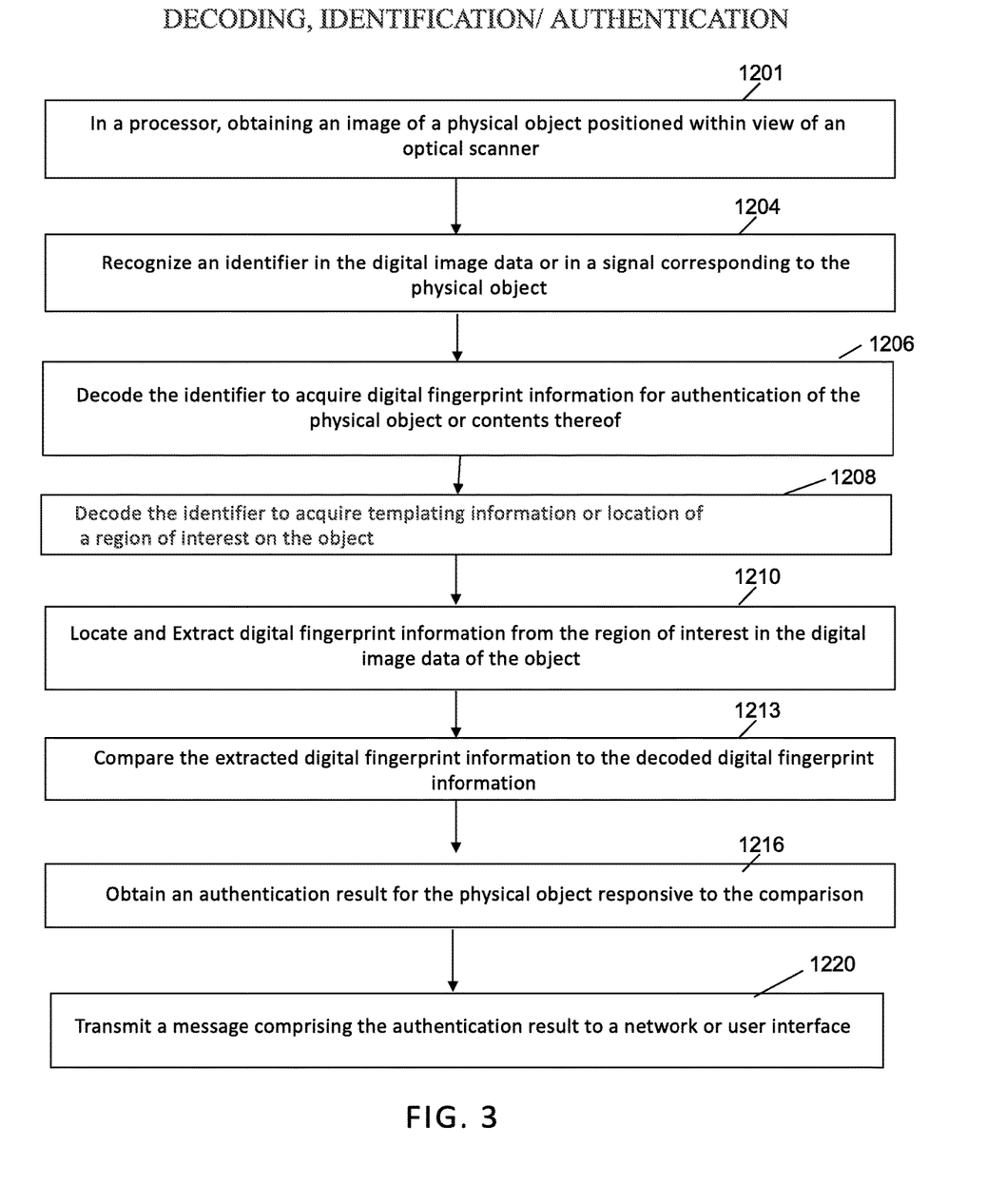
FIG. 3 is a simplified flow diagram of one example process for identification and or authentication of an object utilizing local encoding of authentication data.

FIG. 3 is a simplified flow diagram of one example process to utilize local encoding of intrinsic authentication data to authenticate an object. In this example, a process calls for obtaining an image of a physical object positioned within view of an optical scanner, act 1201. Recognizing an identifier in the digital image data or in a signal corresponding to the physical object, act 1204. In more detail, a "signal" here may refer to an electromagnetic signal in which the identifier is carried or encoded. For example, the signal may be emitted in response to a stimulus, similar to RFID technologies, as mentioned above. Next is decoding the identifier to recover information usable for authentication of the physical object or contents thereof using the identifier (in an example, the recovered information includes a feature vector of a digital fingerprint feature), act 1206. Decode the identifier to acquire templating information or location of a region of interest on the object, act 1208. Extracting authentication information from the digital image data, act 1210. Comparing the extracted authentication information and the recovered information, act 1213. And finally, obtaining an authentication result for the physical object responsive to the comparison, act 1216. Briefly summarized, authentication information is extracted from the identifier on the object, and authentication information such as a digital fingerprint is extracted from the object image data, and the two are compared to authenticate the object without connection to an external information source.

Digital Fingerprinting in General

"Digital fingerprinting" refers to the creation and use of digital records (digital fingerprints) derived from properties of a physical object, which digital records are typically stored in a database. Digital fingerprints maybe used to reliably and unambiguously identify or authenticate corresponding physical objects, track them through supply chains, record their provenance and changes over time, and for many other uses and applications.

In more detail, digital fingerprints typically include information, preferably in the form of numbers or "feature vectors," that describes features that appear at particular locations, called points of interest, of a two-dimensional (2-D) or three-dimensional (3-D) object. In the case of a 2-D object, the points of interest are preferably on a surface of the corresponding object; in the 3-D case, the points of interest may be on the surface or in the interior of the object. In some applications, an object "feature template" may be used to define locations or regions of interest for a class of objects. The digital fingerprints may be derived or generated from digital data of the object which may be, for example, image data.

While the data from which digital fingerprints are derived is often images, a digital fingerprint may contain digital representations of any data derived from or associated with the object. For example, digital fingerprint data may be derived from an audio file. That audio file in turn may be associated or linked in a database to an object. Thus, in general, a digital fingerprint may be derived from a first object directly, or it may be derived from a different object (or file) linked to the first object, or a combination of the two (or more) sources. In the audio example, the audio file may be a recording of a person speaking a particular phrase as detailed above. The digital fingerprint of the audio recording may be stored as part of a digital fingerprint of the person speaking. The digital fingerprint (of the person) may be used as part of a system and method to later identify or authenticate that person, based on their speaking the same phrase, in combination with other sources.

In the context of this description, a digital fingerprint is a digital representation of the physical object. It can be captured from features of the surface, the internals, the progression of the object in time, and any other repeatable way that creates a digital fingerprint that can be uniquely and securely assigned to the particular digital object. The physical object may be a living object.

Feature extraction or feature detection may be used to characterize points of interest. In an embodiment, this may be done in various ways. Two examples include Scale-Invariant Feature Transform (or SIFT) and Speeded Up Robust features (or SURF). Both are described in the literature. For example: "Feature detection and matching are used in image registration, object tracking, object retrieval etc. There are number of approaches used to detect and matching of features as SIFT (Scale Invariant Feature Transform), SURF (Speeded up Robust Feature), FAST, ORB etc. SIFT and SURF are most useful approaches to detect and matching of features because of it is invariant to scale, rotate, translation, illumination, and blur." MISTRY, Darshana et al., *Comparison of Feature Detection and Matching Approaches: SIFT and SURF*, GRD Journals—Global Research and Development Journal for Engineering I Volume 2 I Issue 4 I March 2017.

In some embodiments, digital fingerprint features may be matched, for example, based on finding a minimum threshold distance. Distances can be found using Euclidean distance, Manhattan distance, etc. If distances of two points are less than a prescribed minimum threshold distance, those key points may be known as matching pairs. Matching a digital fingerprint may comprise assessing a number of matching pairs, their locations or distance and other characteristics. Many points may be assessed to calculate a likelihood of a match, since, generally, a perfect match will not be found. In some applications an "feature template" may be used to define locations or regions of interest for a class of objects.

In an embodiment, features may be used to represent information derived from a digital image in a machine-readable and useful way. Features may be point, line, edges, and blob of an image etc. There are areas as image registration, object tracking, and object retrieval etc. that require a system or processor to detect and match correct features. Therefore, it may be desirable to find features in ways that are invariant to rotation, scale, translation, illumination, noisy and blurry images. The search of interest points from one object image to corresponding images can be very challenging work. The search may preferably be done such that same physical interest points can be found in different views. Once located, points of interest and their respective characteristics may be aggregated to form the digital fingerprint (generally also including 2-D or 3-D location parameters).

Scanning

In this application, the term "scan" is used in the broadest sense, referring to any and all means for capturing an image or set of images, which may be in digital form or transformed into digital form. Images may, for example, be two dimensional, three dimensional, or in the form of a video. Thus a "scan" may refer to an image (or digital data that defines an image) captured by an imager, scanner, a camera, a specially adapted sensor or sensor array (such as a CCD array), a microscope, a smartphone camera, a video camera, an x-ray machine, a sonar, an ultrasound machine, a microphone (or other instruments for converting sound waves into electrical energy variations), etc. Broadly, any device that can sense and capture either electromagnetic radiation or mechanical wave that has traveled through an object or reflected off an object or any other means to capture surface or internal structure of an object is a candidate to create a "scan" of an object.

Various means to extract "fingerprints" or features from an object may be used; for example, through sound, physical structure, chemical composition, or many others. The remainder of this application will use terms like "image" but when doing so, the broader uses of this technology should be implied. In other words, alternative means to extract "fingerprints" or features from an object should be considered equivalents within the scope of this disclosure. Similarly, terms such as "scanner" and "scanning equipment" herein may be used in a broad sense to refer to any equipment capable of carrying out "scans" as defined above, or to equipment that carries out "scans" as defined above as part of their function. Attestable trusted scanners should be used to provide images for digital fingerprint creation. Scanner may be a single device or a multitude of devices working to enforce policy and procedures.

Authentication

More information about digital fingerprinting can be found in various disclosures and publications assigned to Alitheon, Inc. including, for example, the following: DIGITAL FINGERPRINTING, U.S. Pat. No. 8,6109,762; OBJECT IDENTIFICATION AND INVENTORY MANAGEMENT, U.S. Pat. No. 9,152,862; DIGITAL FINGERPRINTING OBJECT AUTHENTICATION AND ANTI- COUNTERFEITING SYSTEM, U.S. Pat. No. 9,443,298; PERSONAL HISTORY IN TRACK AND TRACE SYSTEM, U.S. Pat. No. 10,037,537; PRESERVING AUTHENTICATION UNDER ITEM CHANGE, U.S. Pat. App. Pub. No. 2017-0243230 A1; AUTOMATED AUTHENTICATION REGION LOCALIZATION AND CAPTURE, U.S. Pat. App. No. 62/842,444 filed May 2, 2019; and LOCAL ENCODING OF INTRINSIC AUTHENTICATION DATA, U.S. Pat. App. No. 63/006,059 filed Apr. 6, 2020. Each of these patents and publications is hereby incorporated by this reference.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include an/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers. Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, hand-held or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry, or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks, and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general-purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired levels of performance and cost.

As disclosed herein, features consistent with the disclosure may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list, and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

The invention claimed is:

1. A system comprising:
   at least one image sensor operable to acquire digital image data representing at least a portion of a physical object positioned within view of the at least one image sensor;
   a digital processor communicatively coupled to the at least one image sensor and communicatively coupled to a non-volatile memory, the memory storing instructions executable on the processor wherein the instructions include:
   an encoding component to cause the processor to generate a unique identifier, the unique identifier including encoded information to locate at least one region of interest on the physical object and including encoded digital fingerprint information extracted from the digital image data acquired at the location of interest; and
   an authentication component to cause the processor to decode information encoded in a unique identifier of a target object, locate and extract digital fingerprint information from digital image data of the target object, and compare the extracted digital fingerprint information to digital fingerprint information decoded from the unique identifier to form an authentication result; and
   an interface communicatively coupled to the digital processor and configured to receive the unique identifier and/or an indication of the authentication result and to take a predetermined action based on the received unique identifier.

2. The system of claim 1, further comprising a printer communicatively coupled to the processor or to the interface and arranged to print the unique identifier on to the physical object.

3. The system of claim 1, wherein the encoded digital fingerprint information extracted from the digital image data acquired at the location of interest includes a feature vector of at least one intrinsic feature of the physical object.

4. The system of claim 1, wherein the system is arranged in a unit such as a kiosk or fixed terminal.

5. The system of claim 1, wherein the system is provisioned in a mobile device.

6. The system of claim 1, wherein the system is provisioned in a smart phone wherein an onboard camera of the smart phone serves as the at least one image sensor and a display screen of the smart phone provides the interface.

7. The system of claim 1, wherein the authentication component further causes the processor to: detect a condition in which the authentication component cannot locate the region of interest in the image data; and responsive to detecting the condition, display a message on a display of the interface to instruct a user to activate the at least one image sensor to capture additional digital image data to include the region of interest for authenticating the target object.

8. The system of claim 1, wherein the authentication component further causes the processor to identify the region of interest based on at least one of a feature template in the decoded information or location data that is present in the decoded information.

9. The system of claim 1, including an emitter to emit a stimulus electromagnetic signal to stimulate a unique identifier on a physical object to produce a signal; and a receiver coupled to the processor to receive the signal; wherein the signal encodes the unique identifier.

10. The system of claim 1, wherein the encoded digital fingerprint information includes a feature vector of a digital fingerprint feature.

11. A method comprising:
   in a processor, acquiring a unique identifier of a target physical object;
   in the processor, decoding the unique identifier to acquire digital fingerprint information of the target physical object and location information associated with the digital fingerprint information;

imaging at least a portion of the physical object to acquire digital image data based on the location information;

in the processor, extracting digital fingerprint information based on the acquired digital image data;

in the processor, comparing the extracted digital fingerprint information to the decoded digital fingerprint information to form a result; and in the processor, executing a programmatic action based on the result.

12. The method of claim 11, wherein acquiring the unique identifier includes provisioning at least one image sensor and operating the at least one image sensor to image at least a portion of the target physical object that includes the unique identifier.

13. The method of claim 11, wherein acquiring the unique identifier includes electromagnetically stimulating the physical object and receiving a signal responsive to the stimulating of the physical object, wherein the received signal carries the unique identifier.

14. The method of claim 11, wherein the programmatic action includes transmitting a message to a user interface indicating authentication of the target physical object.

15. The method of claim 11, wherein the decoded location information includes a template or offset to find a location of a region of interest in the target physical object; and the imaging includes imaging a portion of the physical object that includes the region of interest.

16. The method of claim 11, wherein decoding the unique identifier further determines what or how many feature vectors of a region of interest are sufficient to allow a result that indicates authentication of the target physical object.

17. The method of claim 11, including, in the processor, adding additional information to the information decoded from the unique identifier; and in the processor, determining feature vector values for authentication based on both the decoded information and the added additional information.

18. The method of claim 11, wherein the comparing includes determining whether the extracted digital fingerprint matches the decoded digital fingerprint within a predetermined threshold or confidence level.

* * * * *